(12) United States Patent
Feldman et al.

(10) Patent No.: US 6,739,203 B1
(45) Date of Patent: May 25, 2004

(54) ULTRASONIC TRANSDUCER AND FLOW SENSOR CONFIGURATION

(76) Inventors: Marvin J. Feldman, 123 Bayside Dr., Clearwater, FL (US) 33767; Murray F. Feller, 21577 NW. 75th Avenue Rd., Micanopy, FL (US) 32667

( * ) Notice: Subject to any disclaimer, the term of this patent is extended or adjusted under 35 U.S.C. 154(b) by 69 days.

(21) Appl. No.: 10/222,411

(22) Filed: Aug. 16, 2002

(51) Int. Cl.⁷ .................................. G01F 1/66
(52) U.S. Cl. ................................... 73/861.27
(58) Field of Search .................. 73/861.27, 861.29, 73/861.28

(56) References Cited

U.S. PATENT DOCUMENTS

| | | | |
|---|---|---|---|
| 3,781,576 A | * 12/1973 | Runde et al. | 73/644 |
| 4,395,652 A | * 7/1983 | Nakanishi et al. | 73/625 |
| 4,825,116 A | * 4/1989 | Itoh et al. | 73/642 |
| 5,329,202 A | * 7/1994 | Garlick et al. | 310/334 |
| 5,664,456 A | * 9/1997 | Eckert | 73/290 V |
| 5,747,672 A | * 5/1998 | Parent et al. | 73/861.25 |
| 5,938,612 A | * 8/1999 | Kline-Schoder et al. | 310/334 |
| 6,142,015 A | * 11/2000 | Getman et al. | 73/861.27 |
| 6,162,178 A | * 12/2000 | Garcia et al. | 600/459 |
| 6,253,615 B1 | * 7/2001 | Simmonds et al. | 73/579 |
| 6,422,093 B2 | * 7/2002 | Feller | 73/861.27 |
| 6,466,513 B1 | * 10/2002 | Pabon et al. | 367/35 |

* cited by examiner

Primary Examiner—Edward Lefkowitz
Assistant Examiner—Takisha Miller
(74) Attorney, Agent, or Firm—David Kiewit

(57) ABSTRACT

Ultrasonic transducers for use in time-of-flight flow measurement are made by clamping a conformal material between a face of a piezoelectric element and a housing so as to efficiently acoustically couple the piezoelectric element to a flowing fluid wetting the housing. Both in-line and probe sensing heads are described, where the in-line sensor heads make use of side-looking transducers. Acoustic isolation arrangements are used to ensure that the transducer transmits and receives acoustic energy in a single, well-defined direction. Various pre-loading arrangements, such as metal springs that can be set by driving a wedge between the spring and the housing, are used to controllably force the piezoelectric element toward the housing.

18 Claims, 4 Drawing Sheets

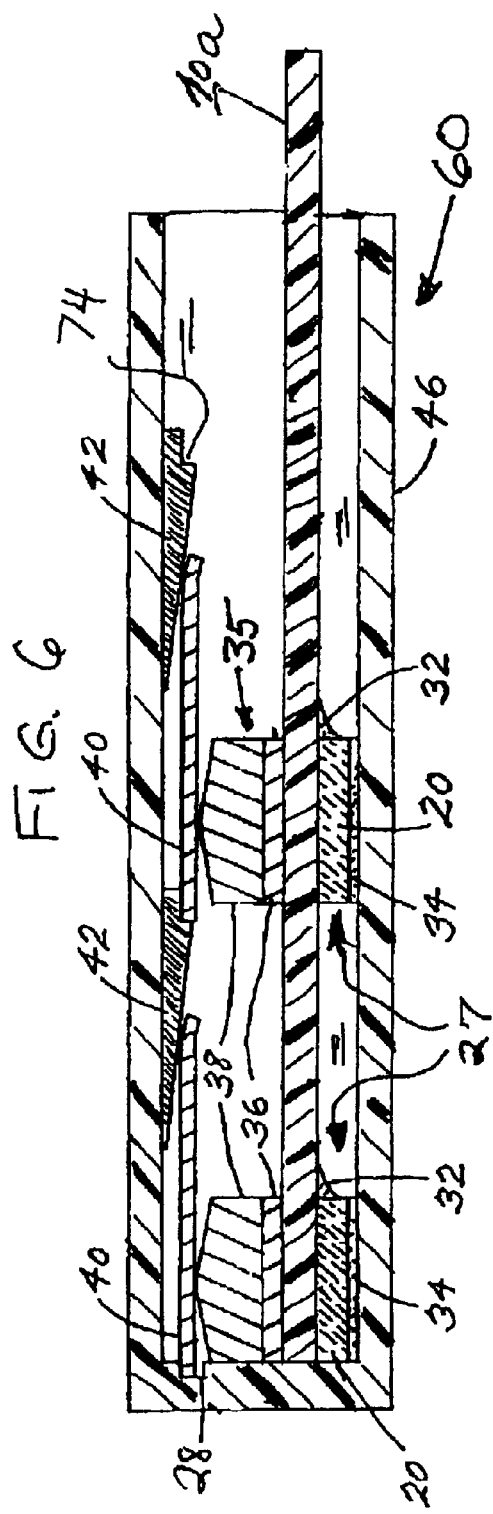
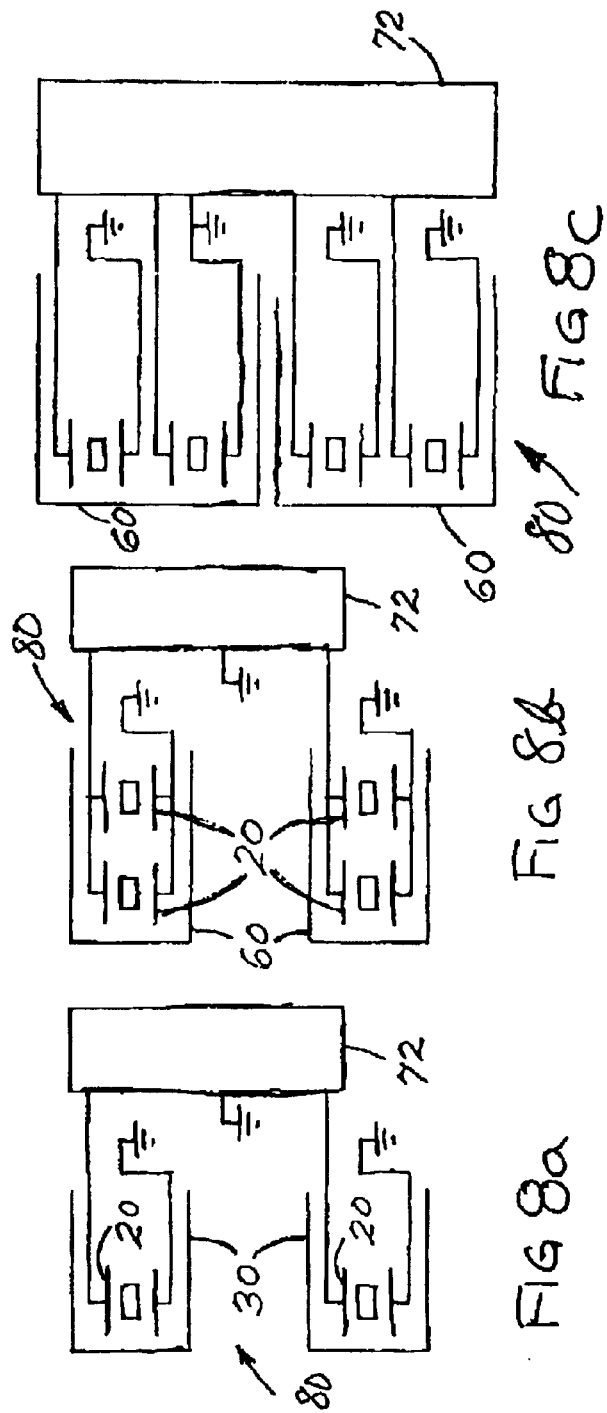

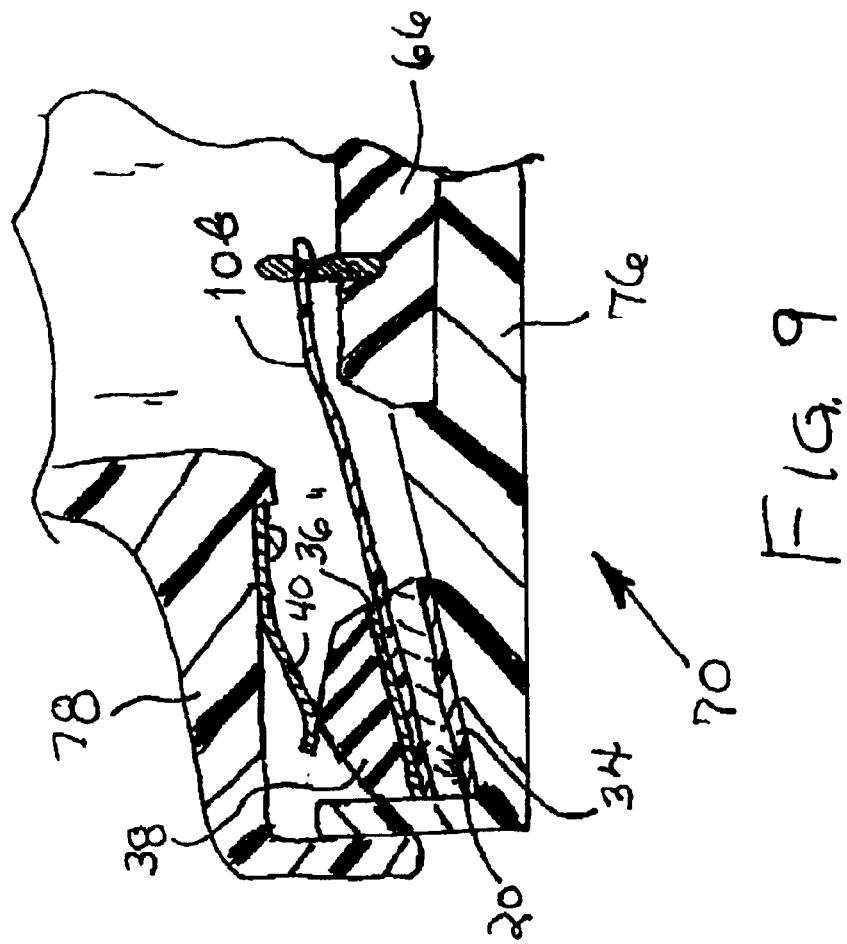
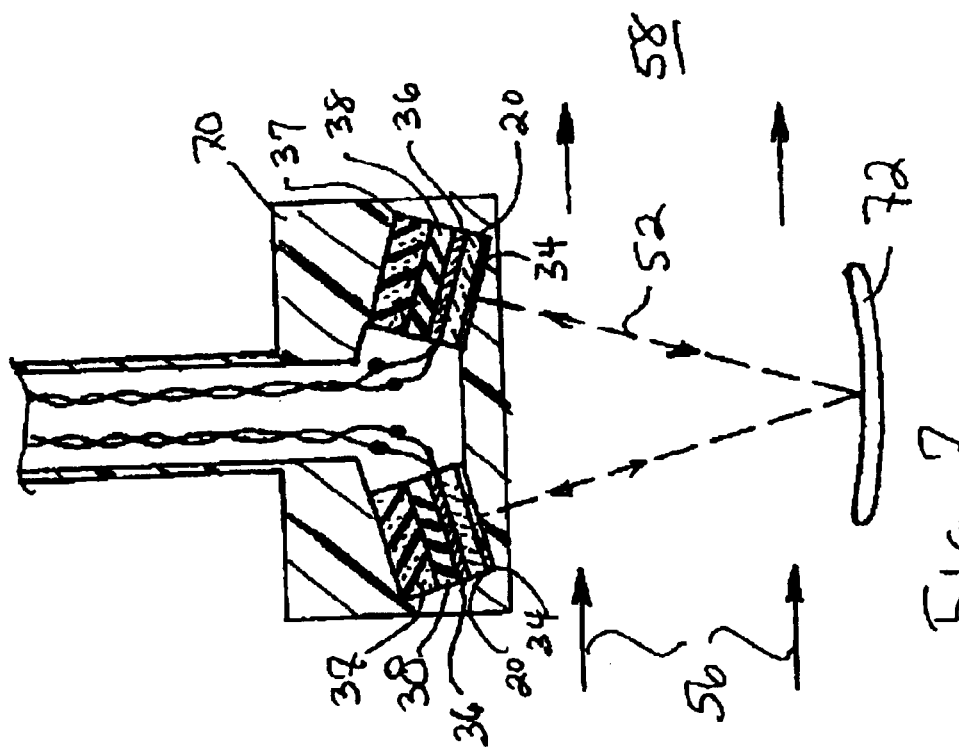

ULTRASONIC TRANSDUCER AND FLOW SENSOR CONFIGURATION

FIELD OF THE INVENTION

This invention relates to apparatus using ultrasonic energy and particularly to apparatus for determining the rate of flow of a fluid in which the propagation times of ultrasonic signals transmitted through the fluid are detected to determine flow rate. Examples of such sensors are described in U.S. Pat. Nos. 6,178,827, 6,370,963 and 6,422,093, the disclosures of which are included herein by reference.

BACKGROUND INFORMATION

Ultrasonic transit time flow sensors, also known as "time of flight ultrasonic flow sensors", detect the acoustic propagation time difference between ultrasonic signals transmitted upstream and downstream through a flowing fluid and process the time difference information to derive the fluid flow rate. The propagation time difference is very small and must be detected with high resolution and stability for the sensor to be practical. The ultrasonic transducers and their interfaces to the fluid are generally the major sources of detection instability. It is an object of this invention to minimize this problem in a cost effective way.

Prior art ultrasonic transit time flow sensors generally beam acoustic energy through only a small part of an overall flow profile and infer the overall fluid flow from that measurement. Because the fluid flow through the sensor is generally not uniform and because the flow distribution varies with flow rate and conditioning, determining volumetric flow rate is prone to error. At substantial additional cost, some of these sensors use internal reflective surfaces or multiple pairs of transducers to detect the flow rate at several locations in the flow profile. It is a further object of this invention to provide an ultrasonic time of flight flow sensor capable of measuring a flow rate of a large portion of the fluid at low cost.

BRIEF SUMMARY OF THE INVENTION

The invention provides an ultrasonic transducer for a time of flight flow sensor that comprises a housing, a conformal layer, a thickness-mode piezoelectric transducer element and means for clamping the conformal layer between one of the faces of the transducer element and an internal surface portion of the housing. The preferred transducer also comprises an acoustic isolation means for acoustically isolating a second face of the piezoelectric element from the housing; and pre-loading means for biasing the piezoelectric element toward the internal surface portion of the housing so as to clamp the conformal layer therebetween.

Preferred embodiments of the present invention use a piezoelectric transducer element having both of its two electrical contacts on one surface which is brought into mechanical contact with a mating connector to form part of a stack of acoustic components. A quarter wave resonator and a massive acoustic load are preferably attached to the side of the connector opposite to the electrical contacts to complete the stack. The stack is spring-loaded so as to be squeezed against a lateral inside surface of its housing, where a compliant film is located to fill in the low spots, and to generally provide a conformable interface when clamped between the mating piezoelectric element and housing surfaces. A preferred spring is tensioned with a wedge which can be controllably inserted into the housing in order to adjust the spring bias so that the preload pressure is evenly distributed on the element. The entire assembly is then preferably encapsulated. Such an assembly exhibits excellent acoustic stability and uses only low cost components. The preferred combination of spring pre-loading and a compliant coupling film makes the assembly very forgiving of mechanical dimensional changes so that the acoustic coupling between element and housing is stable, thereby reducing transit time detection error.

These transducers are preferably spaced apart along the flow direction on opposite sides of a flow sensor body and communicate directly with each other through the fluid, preferably on a diagonal path. For smaller flow sensors, for example, with a 1" bore, transducers of the invention may comprise single piezoelectric elements which may be relatively long and thin, for example, 0.6" long and 0.125" wide, in order to provide a relatively wide acoustic beam passing through a major fraction of the fluid that flows through the sensor. Such a long and thin element is practical because neither its assembly and mounting procedure, nor its subsequent pressure loading is likely to stress it to fracture. The use of an equivalent element and stack assembly in a conventionally configured sensor of the same size is generally impractical because the elements, being round and relatively large, and mounted at the end of the transducer, would require considerably more material, which would substantially increase the cost of the sensor.

For larger flow sensors, transducers of the invention preferably comprise two or more piezoelectric elements in order to effectively detect the fluid flow rate over most of the flow passage. The preferred piezoelectric elements may be in contact with a single mating connector which can be configured to connect them in parallel or to allow access to them individually. When individual element access is desired, the elements can be selected for operation at different times and their detected transit times weighted for location in the flow passage to enable very high volumetric detection precision to be obtained. Individual element access also enables a variety of element characteristics, such as different operating frequencies, to be accommodated as may be desired.

Although it is believed that the foregoing recital of features and advantages may be of use to one who is skilled in the art and wishes to learn how to practice the invention, it will be recognized that the foregoing is not intended to list all of the features and advantages. Moreover, it may be noted that various embodiments of the invention may provide various combinations of the hereinbefore cited features and advantages of the invention, and that less than all of the recited features and advantages of the invention may be provided by some embodiments.

BRIEF DESCRIPTION OF THE DRAWINGS

FIG. 6 is a longitudinal cross sectional view of an alternate transducer configuration from which the encapsulating material has been omitted in the interest of clarity of presentation.

FIG. 7 is a longitudinal cross-sectional view of a portion of a flow transducer of the invention configured as an insertion flow probe.

FIG. 8a is a schematic block diagram of a flow sensor in accordance with one preferred embodiment of the present invention.

FIG. 8b is a schematic block of a flow sensor in accordance with another preferred embodiment of the present invention.

FIG. 8c is a schematic block diagram of a flow sensor i accordance with yet another preferred embodiment of the present invention.

FIG. 9 is a detailed cross-sectional view of a flow probe of the invention

DETAILED DESCRIPTION OF THE INVENTION

Figure 1:
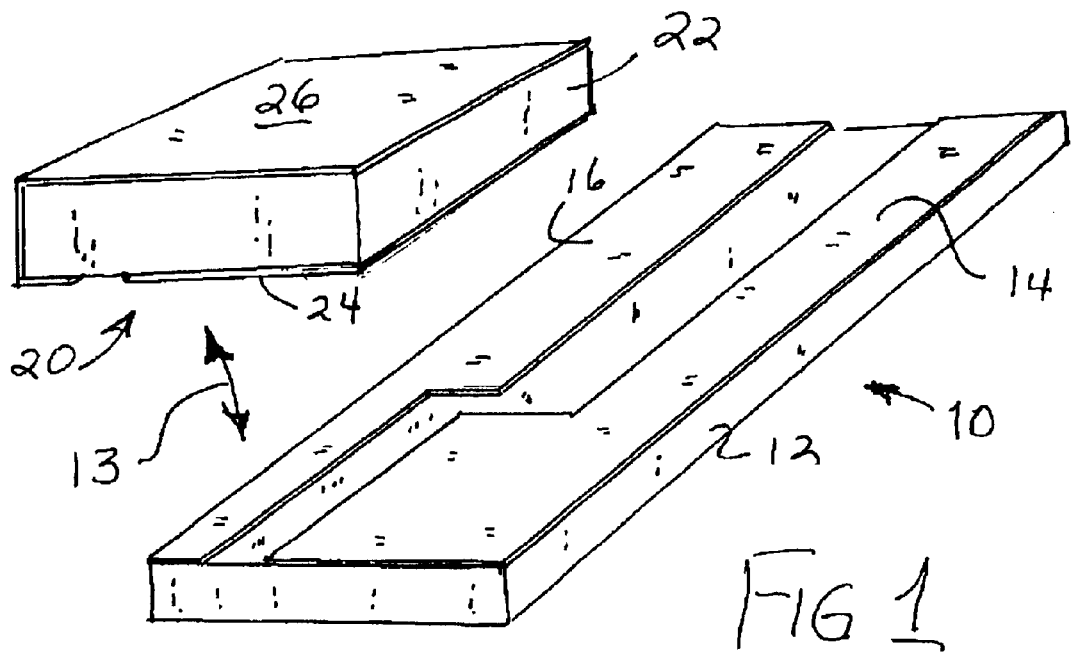
FIG. 1 is an exploded view of a piezoelectric transducer and an associated connector wherein a distorted vertical scale is used to more clearly depict contact metallization layers.

Turning now to FIG. 1, one finds an exploded view showing a preferred combination of a connector 10 and a piezoelectric transducer element 20. In this depiction the thicknesses of various metallic layers are grossly exaggerated in the interest of clarity of presentation. The connector 10 preferably comprises an electrically insulating substrate 12, typically made from 0.015" thick glass epoxy printed circuit board stock. The insulating body 12 carries thin electrically conductive layers 14 and 16, typically made from 0.0012 inch thick copper which may further have a very thin corrosive resistant plating disposed on it.

A preferred piezoelectric transducer element 20 is designed for thickness-mode excitation, and comprises an electrically insulating piezoelectric active substrate 22, which is typically formed from a lead zirconate titanate (PZT) ceramic body. In a conventional thickness mode transducer element 20, one would find two mutually insulated electrically conductive layers 24, 26 disposed on respective parallel flat faces of the substrate 22, with respective individual electric leads connected to each of them. As will be disclosed at greater length hereinafter, an electric lead attached directly to the face of the transducer element that is to be assembled in an abutting relation with a conformal coupling layer 34 could degrade the acoustic coupling between the transducer element and a housing 46. Hence, in the preferred embodiment depicted in FIG. 1, the conductor 26 associated with that transducer element face that will abut the coupling film 34 extends around an edge of the substrate 22 onto the other of the two parallel faces so that electrical contact can be made to both conductors on the same side of the PZT body 22.

In a typical piezoelectric element 20, the substrate 22 may have a length, measured along a direction aligned with the axis of the connector 10 and of the housing 46, of 0.200"; a width, measured along a direction transverse to the axis of the connector 10 and lying in the contact plane of 0.125"; and a thickness between the two parallel faces bearing electrodes 24, 26 of 0.020". The two thin conductive layers 24, 26 are separated, on the top surface of the element, by a bare portion of the substrate that is preferably 0.020" wide. This typical element normally operates at a resonant frequency of about 4 megahertz.

Although the preferred piezoelectric element 20 depicted in the drawing is a rectangular parallelpiped having two parallel active faces, it will be recognized that other shapes could also be used. For example, one could consider a piezoelectric element configured as a cylindrical shell for providing an arcuate acoustic beam and used with a connector having a cylindrical surface. Alternately, one could consider an element having a flat surface for contacting a connector, a spherical or cylindrical surface clamped against a housing and a cylindrical wall connecting those surfaces, where an element of that sort could be used to provide a range of acoustic frequencies.

When the connector 10 and transducer element 20 are brought together, as indicated by the double-headed arrow 13, the connector metallizations 14, 16, match up to with the transducer element electrodes 24, 26, respectively, so that when the connector 10 and transducer element 20 are further squeezed together, a good electrical connection is made between them. The end of the connector 10 distal from the transducer element 20 can then be used to electrically access the piezoelectric element 20 and can be electrically connected by soldering or other means to the supporting electronics.

Figure 2:
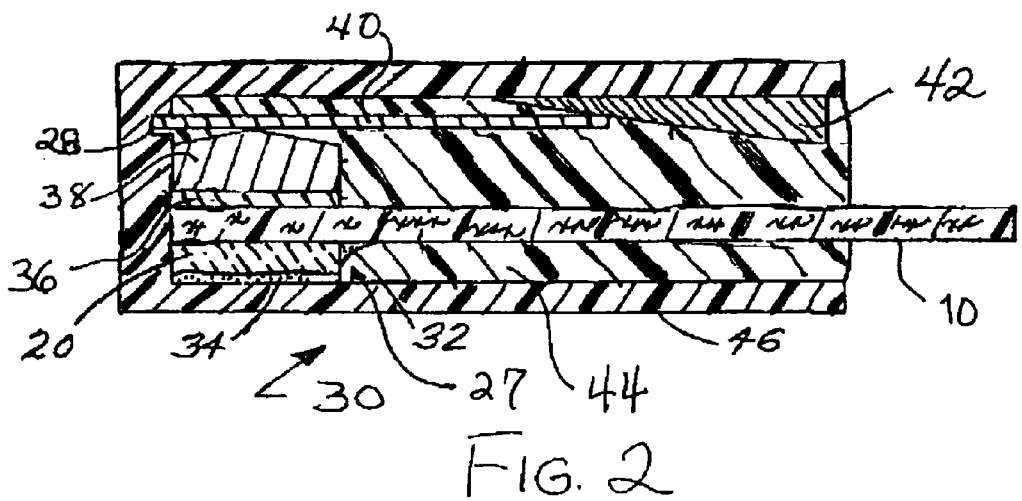
FIG. 2 is a longitudinal cross-sectional view section of a transducer assembly constructed in accordance with a preferred embodiment of the present invention.

As with many other transducers used in ultrasonic flow sensors, a preferred transducer 30 of the invention is configured so as to efficiently emit and receive acoustic beams in a single, well defined direction when driven by a suitable external electrical power supply. This performance may be achieved by incorporating an acoustic isolation means 35 which may, as depicted in FIG. 2, comprise a quarter wavelength resonant stub 36 and a large acoustic mass 38 into a transducer subassembly 27, or stack, that comprises a piezoelectric element 20, a connector 10, a stub 36 and a mass 38. In one preferred embodiment, the resonant stub 36 is formed from an aluminum body having the same lateral dimensions as those of the associated piezoelectric element and having a thickness of 0.010", which is substantially equal of one quarter of a wavelength of an acoustic excitation generated by operating the preferred piezoelectric element at a resonant frequency of about 4 MHz. It should be recognized that many other materials could serve that purpose. For example, an experimental transducer was made in which thin sheets of closed cell polymeric foam were used to form a non-resonant isolator of relatively low efficiency, and to also serve the pre-loading function provided by a metal spring in the embodiment depicted in FIG. 2. Correspondingly, a preferred acoustic mass 38 is a chunk of tungsten carbide or other highly dense material selected to maximize the mass that can be used within a suitably sized housing 46.

In a preferred configuration the transducer subassembly 27 is glued together before being inserted into the housing 46. Although the mass 38, the stub 36 and the connector 10 can be held together by layers of adhesive on their mating surfaces, the mating surfaces of the transducer element 20 and the connector 10 must be kept free of the adhesive in order to assure good electrical contact when these two elements are squeezed together. Thus, a small bead 32 of adhesive is used at one edge of the transducer element 20 to hold it to the connector 10. As will become clear from the ensuing portions of the disclosure, the transducer subassembly 27 is ultimately clamped in place mechanically, so that the gluing procedures and choice of adhesives recited here are merely used to hold the parts in alignment during assembly. Suitable mechanical jigging arrangements could also be used for this purpose. Moreover, one could also consider assembling the various elements in situ in the housing 46.

Figure 4:
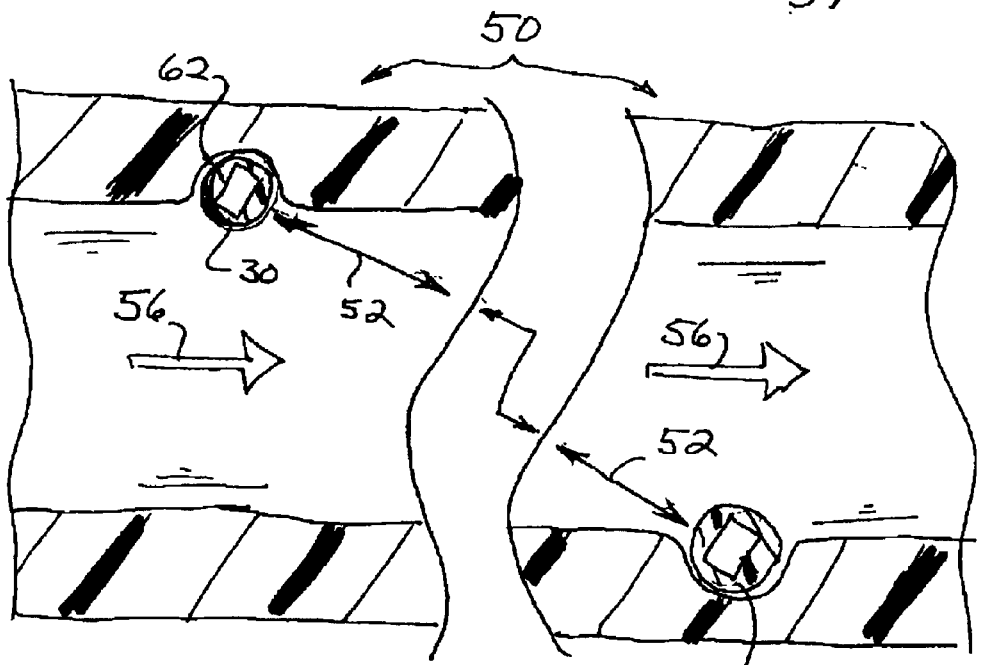
FIG. 4 is a detailed sectioned view of the sensor in FIG. 3 taken perpendicular to the axes of the parallel transducers. The contents of the transducer housings have been omitted from FIG. 4 in the interest of clarity of presentation.

In a preferred embodiment the housing 46 is an injection molded polysulfone closed-end cylindrical body having a rectangular prismatic cavity within it. This cavity has an end wall and four flat side walls extending from the end wall. The transducer subassembly 27 is inserted into a cavity of the housing 46 so that an output face of the piezoelectric element 20 is coupled to a flat wall of the housing 46 by a conformal coupling film 34. The end wall of the housing preferably has a notch 28 formed in it for retaining an end of a spring 40, as will subsequently be described. Other configurations for the housing may be considered as long as there is an inner wall provided that can be conformably coupled to a piezoelectric element—e.g., one could consider a piezoelectric element having two parallel cylindrical faces, rather than flat ones, and that was coupled to the inside of a circular cylindrical cavity. Generally speaking, the shape of the external surface of the housing is chosen to provide a good streamlined profile for insertion. Thus, a transverse cross-section of a preferred housing (e.g., as seen in FIG. 4, where the transducer stack is omitted for clarity of presentation) shows a rectangular hole in a circular body.

The conformal coupling film 34 is used to acoustically couple the piezoelectric transducer element 20 to the housing 46. Those skilled in the acoustic transducer arts will recognize that the presence of air bubbles, voids, fracture surfaces, etc. will degrade this coupling. This can lead to an acoustic output signal that is unstable and or of low magnitude because of the poor coupling, and can introduce serious errors into the acoustic propagation time measurement that is the basis of a time of flight flow sensor. Thus, although there are many possible choices for a conformal layer material, all such choices must be directed at avoiding the formation of parasitic interfaces in the structure either at the time of manufacture or during the service life of the transducer assembly. These voids can be formed due to dimensional changes in the housing, which can originate from the stress acquired by molding or machining operations, moisture absorption, or unequal expansion of internal components as temperatures change. In a preferred embodiment of the present invention, the conformal layer is provided by a Type F-9469PC adhesive transfer tape sold by the 3M Corporation of St. Paul Minn. This adhesive transfer tape, which initially has a uniform 0.005 inch thickness, is supplied on a carrier film, from which it can be peeled off and adhered to the output face of the piezoelectric transducer element 20 prior to inserting the subassembly 27 into the housing 46. It will be recognized that other approaches to applying the conformal coating, such as placing the conformal coating material in the housing 46 prior to insertion of the subassembly 27, although not preferred, are within the scope of the present invention. Moreover, although the preferred embodiments provide for clamping a conformal film of uniform thickness between a flat piezoelectric element face and a flat internal cavity wall of a housing, it will be recognized that various coupling materials may be as efficient at transmitting acoustic energy as are various housing materials and that therefore there are no particular limits on the shape of the conformal material or of the cavity in the housing. AU that is required is that the conformal material can be clamped into position so as to completely fill whatever space there is between the piezoelectric element and the internal wall portion of the cavity.

In a preferred assembly method, the glued-together transducer subassembly 27 is inserted into the housing 46 with the conformal layer 34 in position and the subassembly is then mechanically biased against the housing by means of a spring arrangement comprising a spring 40 and an adjusting wedge 42. In the preferred embodiment depicted in FIG. 2, a flat steel spring 40 is placed in the housing 46 so that one end of the spring 40 is retained in the housing notch 28. A wedge 42 is then inserted so that the narrow tip of the wedge 42 is between the spring 40 and a wall of the housing 46 and the wedge is pushed inwardly so as to push that end of the spring 40 that is distal from the notch 28 away from the housing and to thereby increase the spring biasing forces squeezing the transducer subassembly 27 together. By controlling the insertion depth or insertion pressure of the wedge 42, the pressure squeezing the stack can be controlled. This allows an optimum spring bias loading to be set on a production basis. Because the length of the portion of the spring 40 extending towards the open end of the housing from its contact with the mass 38 can be made considerably larger than the length on the other side of the mass, considerable mechanical advantage can be enjoyed in exerting a relatively small insertion force on the wedge to yield a much larger force squeezing the stack 27. The optimum force is generally selected to be as high as possible without causing unacceptable mechanical changes, such as distortion of the body 46, over the life of the sensor. In typical applications this force can easily reach several pounds for the typical element 20 described above.

In the spring arrangement described above, the wedge 42 can be formed from any of a number of materials, such as brass or glass-reinforced epoxy circuit board material Moreover, different sorts of spring arrangements can also be used to provide the desired biasing forces. In one experimental embodiment, for example, a piece of closed-cell polymeric foam was used as the spring and as part of the stack. In this embodiment a long wedge was pushed between the mass and the back wall of the transducer housing in order to squeeze down the stack Thus, it is recognized that a wide variety of approaches for supplying a suitable mechanical biasing force for holding the transducer element 20 in good contact with the housing 46 are within the scope of the present invention.

In a somewhat different embodiment of the invention, a polymeric closed cell foam 37, which may comprise a plurality of thin sheets of foam, is used as a pre-loading means instead of the metal spring discussed above. This is depicted in FIG. 7, which shows one of several flow probe embodiments that have been designed. In the particular embodiment of FIG. 7, which does not employ an elongated connector, two subassemblies are put together (e.g., with various adhesives) outside the probe body 70 and are then inserted into the throat of the probe and pushed laterally into the two slanted cavities having front walls aligned so as to define an acoustic beam 52 with a separate reflector 72. As depicted in FIGS. 7 and 9, and as described in the inventor's U.S. Pat. No. 6,422.093, this provides two transducers spaced out along the flow direction 56 and at an angle to that flow direction. It may be noted that a simpler, but less efficient structure can be prepared in which one of the resonant stub 36 and the acoustic mass 38 are omitted, leaving the polymeric foam to serve both as the pre-loading means and as the acoustic isolation means.

In a preferred flow probe embodiment, as depicted in FIG. 9, the preferred combination of the resonant stub 36, mass 38 and metal spring 40 is used. This embodiment uses a multi-part housing and allows the transducer subassembly 27 to be placed on an end member 76 of the housing and connected, by means of a thin flexible connector 10b, to a header 66, to which leads can be connected at a convenient stage in the assembly process. The spring 40 is attached to a stem member 78 of the housing by suitable means, such as a combination of a receiving lip and adhesive. When the stem 78 and end 76 members are assembled together, where the details of assembly have been omitted from FIG. 9 in the interest of clarity of presentation, the spring 40 applies a selected preload force to the acoustic mass 38. As in other embodiments, this serves to clamp the compliant material between the piezoelectric element 20 and the housing as well as to spread the clamping forces over substantially the entire area of the piezoelectric element and thereby avoid fracturing the brittle piezoelectric element by localized loading.

After the transducer subassembly 27 is suitably biased within the housing 46, assembly of a preferred transducer 30 is completed by filling the remaining empty internal volume of the housing with an encapsulating, or potting, material 44. The encapsulant 44 is selected to be rigid enough to solidify the transducer, but must nevertheless be soft enough to allow the force exerted by the spring 40 to generate whatever slight movements are necessary to maintain the acoustic connection between the piezoelectric element and the housing. One successful encapsulant has been an epoxy with a hardness of seventy five, as measured on the Shore "D" scale.

Figure 3:
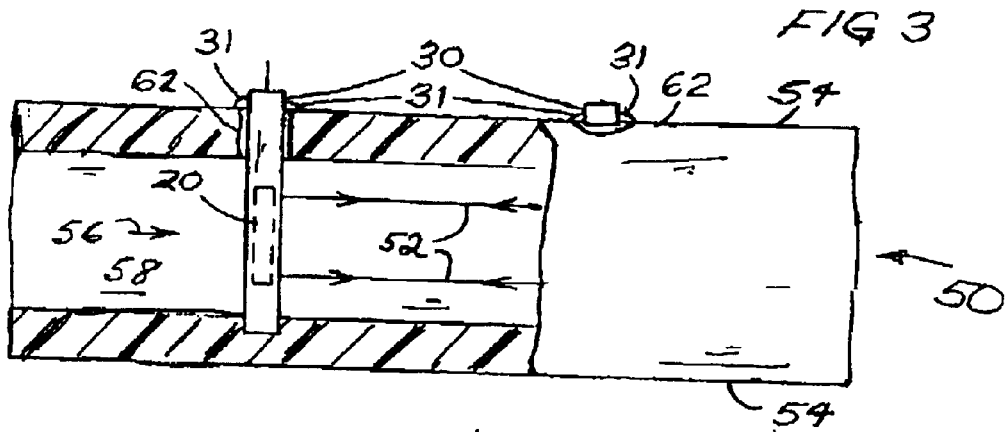
FIG. 3 is a partly cut away view taken along of a flow sensor body in accordance with a preferred embodiment of the present invention.
Figure 5:
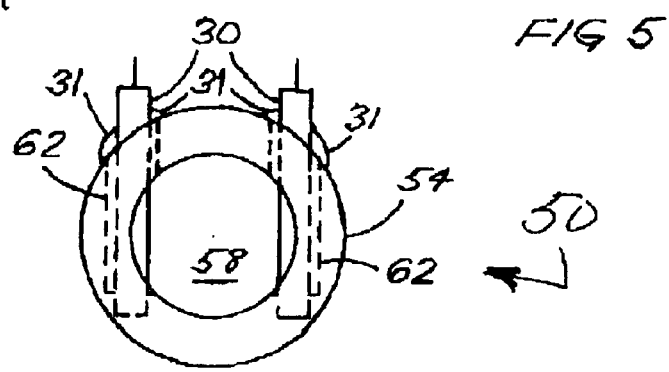
FIG. 5 is a partial end view of the sensor of FIGS. 3 and 4.

FIGS. 3, 4 and 5 illustrate the principle components of the wetted portion of an ultrasonic flow sensor body 50 in accordance with preferred embodiments of the present invention. As depicted in FIG. 3, a fluid 58 flows in the direction as shown by an arrow 56 through a tube 54. Two transducers 30 are mounted in the tube 54 and displaced from each other along the length of travel of the fluid 58. The transducers 30 may be mounted through relatively large openings 62 which enable the active portions of the transducers to be free of any direct contact with the tube 54, although the inactive portions of the transducer housings (i.e., those relatively distal from the active transducer elements) can be directly attached. A preferred mounting arrangement is depicted in the partial sectional view of FIG. 3. This sort of mounting can be done by fastening the ends of the transducers 30 in place with a suitable adhesive 31, or by using mechanical fittings or O-ring seals. Moreover, one could mold the sensor body 50 with the transducer housings 46 being a portion of the integrally molded structure. Regardless of the isolation considerations, the transducers are oriented so that their active elements 20 acoustically communicate with each other as indicated by arrows 52. That is, each piezoelectric transducer element 20 is aligned so that the flat face abutting the housing wall though the conformal layer is perpendicular to an acoustic beam direction as depicted by the arrows 52 in FIGS. 3 and 4.

The selected orientation of the transducers 30 with respect to the fluid 58 allows for sampling a larger fraction of the fluid flow profile than is the case when using smaller prior art transducers. This is particularly evident from FIG. 5 where, if elongated elements 20 as shown in FIG. 3 are used, most of the fluid 58 passing through sensor would contribute to the flow rate measurement. Moderately long elements, e.g., having a greater length for the same width as those described above with reference to the depiction of FIG. 1, are practical because they can be installed and pre-loaded in their housings with a low risk of element fracture. This provides an active transducer region that is substantially equal in length to the elongated piezoelectric element. This approach leads to what is essentially a side-looking transducer comprising a piezoelectric element elongated along the axis of the transducer and used to transmit and receive acoustic beams propagated transverse to the transducer axis. Conventionally configured sensors, by contrast, typically use round elements mounted end-on to the acoustic beam and at a forty five degree angle with respect to the fluid flow. For a prior art transducer to sample an appreciable portion of the flowing fluid, the diameter of the element would approach that of the flow passage. Although this may be acceptable for a small flow sensor, it would result in a significant increase in body size and cost for large flow sensors.

As the size of the flow tube 54 increases, a point is reached where it becomes impractical to use a single element 20 in each side-looking transducer 30 of the invention. This situation can be addressed by fabricating a single elongate side-looking transducer 60 comprising two or more transducer subassemblies 27, as depicted in FIG. 6. In this case, the connector 10*a* is similar to the connector 10 of FIG. 1 but has at least one additional location, spaced apart along the connector axis from the first one, where thin electrically conductive layers 12 and 14 are arranged to electrically mate with a second piezoelectric element 20. In some such arrangements the two piezoelectric elements are electrically connected in parallel so as to define an active region of the transducer extending substantially the aggregate length of the array of spaced-apart piezoelectric elements. It will be noted that although only two such elements are depicted in the drawing, additional elements could be added to form a piezoelectric element array providing a greater active length of the transducer of which they were an integral part. Alternatively, the connections to each element 20 may be such as to allow each to be used separately.

In the multi-element transducer 60 of FIG. 6 each piezoelectric element 20 is fitted with a respective coupling film 34 and stacked with respective resonant stub 36 and mass 38. Springs 40, acting in conjunction with wedges 42, are used to pre-load the stacks. The installation of the connector 10*a* with its stacks 27 is similar to that of the single element transducer 30. The preferred flat springs 40 for the multi-element transducer preferably have small bends adjacent their respective ends nearer the open end of the housing in order to enable the wedges to more readily enter the space between the springs 40 and the housing 42. Moreover, the preferred wedges 42 for the multi-element transducer have small notches 74 on their wide ends so that each wedge can be used to anchor a spring that is closer to the open end of the housing. Although the depiction of FIG. 6 shows only two transducer elements 20, it should be clear that stacks can be added as required. Two-sided or multilayer connector 10*a* construction is beneficially used to facilitate element connection, particularly when separate connections to each element is desired.

It may be noted that various other acoustic beam geometries are known in the art and can be used with transducers of the invention. For example, as depicted in FIGS. 7 and 9, two transducers 30 may be housed in a insertion probe 70 and may use a separate reflector 72 to complete the acoustic path 52 between transducers 30. Other possibilities include, but are not limited to, paired transducers located on the outside surface of tube 54, or a pair of transducers disposed on the same side of the flow tube and using an opposite wall of the tube as a reflector.

FIGS. 8*a*, 8*b* and 8*c* depict simplified electrical schematics of transducers 30 and 60 used with transit time signal processing electronics 72 as the principle elements of flow sensors 80, in accordance with preferred embodiments of the present invention. In FIG. 8*a*, a flow sensor 80 uses two single element transducers 30 connected to electronics 72 to sense fluid flow rate. In FIG. 8*b*, a flow sensor 80 uses multi-element transducers 60 in which the individual transducer elements are connected in parallel to sense fluid flow.

In FIG. 8c, a sensor 80 uses multi-element transducers 60 in which the individual transducer elements are individually connected to the electronics 72 to sense fluid 58 flow rate.

All of these sensors offer a performance enhancement and cost reduction combination which give them a clear advantage over competing products of conventional design. The transducers of the invention are assembled in stacks, inserted into transducer housings and pre-loaded with relative ease, thereby contributing to low manufacturing costs. Additional cost benefits are realized because the sensors use relatively small, low cost elements to detect the flow rate contribution of a large portion of the volume of the flowing fluid. Further, as in the case of sensor 80 in FIG. 9, the invention provides multi-element transducers arranged so that individual elements can be selected for multiplex operation at different times and their detected transit times weighted for location in the flow passage in order to enable very high accuracy over a wide range of flow rates.

As will be understood by those skilled in the art, various embodiments other than those described in detail in the specification are possible without departing from the scope of the invention will occur to those skilled in the art It is, therefore, to be understood that the invention is to be limited only by the appended claims.

What is claimed is:

1. A time of flight flow sensor, comprising:
    at least two thickness-mode piezoelectric transducer elements, each having a respective electrode associated with each of two faces thereof;
    at least one housing;
    a respective conformal layer acoustically coupling each piezoelectric element to the at least one housing, each conformal layer having a respective size selected to entirely cover a first of the two faces of the respective piezoelectric element, each conformal layer disposed between the respective first face and a respective first internal surface portion of the at least one housing;
    at least two connectors, each connector comprising a respective electrically insulating substrate and two electrical conductors disposed thereon, each connector interposed between the respective second face of the piezoelectric element with which it is associated and a respective acoustic isolation means for acoustically isolating the second face of the respective piezoelectric element from the at least one housing; and
    a respective spring disposed between each acoustic isolation means and a respective second portion of the internal surface of the at least one housing, the spring biasing the respective piezoelectric element toward the respective first internal surface portion of the at least one housing so as to clamp the conformal layer between the respective first internal surface portion and the respective piezoelectric element.

2. The flow sensor of claim 1 wherein the two faces of each piezoelectric element comprise respective flat parallel surfaces, wherein the at least one housing comprises at least two cylindrical bodies, each having a rectangular prismatic cavity formed therein, and wherein respective first and second portions of the internal surfaces of the at least two housings comprise respective parallel faces of the respective rectangular prismatic cavities.

3. The flow sensor of claim 1 wherein each acoustic isolation means comprises:
    a respective resonant stub having a thickness substantially equal to one quarter of an acoustic wavelength generated at a resonant operating frequency common to the at least two piezoelectric elements; and
    a respective acoustic mass disposed more distal from the respective piezoelectric element than the respective resonant stub.

4. The flow sensor of claim 1 further comprising a respective adjustment wedge inserted between the respective second portion of the internal surface of the at least one housing and the respective spring.

5. The flow sensor of claim 1 wherein the at least one housing comprises an end member and a stem member, wherein the respective first internal surface portions are disposed on the end member and wherein each spring is attached directly to the stem member.

6. A method of making a time of flight flow sensor, the method comprising the steps of:
    providing a piezoelectric transducer element having two faces separated by a thickness dimension, the piezoelectric element comprising a respective electrode associated with each of its faces for thickness mode operation, a portion of each of the electrodes disposed on a first of the two faces;
    providing a connector comprising an electrically insulating substrate and two electrical conductors disposed on a single surface thereof;
    connecting a respective electrical conductor to each of the electrodes;
    forming a transducer subassembly by adhesively attaching an acoustic isolation means to the first of the faces of the piezoelectric element;
    providing a housing having an internal surface;
    providing a conformal layer;
    positioning the transducer subassembly so as to capture the conformal layer between a first portion of the internal surface of the housing and the second face of the piezoelectric element;
    providing a spring disposed between the first face of the piezoelectric element and a second portion of the internal surface of the housing;
    clamping the conformal layer between the housing and the second face of the piezoelectric element by biasing the spring to obtain a selected preload force; and
    encapsulating the transducer subassembly, conformal layer and spring within the housing.

7. The method of claim 6 wherein the step of connecting respective electrical conductors to the electrodes comprises placing the piezoelectric element in contact with the connector and attaching the piezoelectric element to the connector by means of a bead of adhesive.

8. The method of claim 6 wherein the spring is a flat metal spring biased by insert a wedge between the metal spring and the second internal wall portion of the housing.

9. The method of claim 6 wherein the housing comprises at least an end member and a stem member, wherein the preload force is applied by means of a metal spring attached to the stem member and wherein the step of clamping the conformal layer comprises assembling the end member and the stem member together to form a flow probe assembly.

10. The method of claim 6 comprising the additional steps of:
    providing a second piezoelectric transducer element having respective two faces separated by the thickness dimension, the second piezoelectric element comprising a respective electrode associated with each of the faces for thickness mode operation;
    separately connecting an electrical lead to each of the electrodes of the second piezoelectric transducer element;

forming a second transducer subassembly by adhesively attaching a second acoustic isolation means to the first of the faces of the second piezoelectric element;

providing a second conformal layer;

positioning the second transducer subassembly so as to capture the second conformal layer between a respective first portion of the internal surface of the housing and the second face of the second piezoelectric element;

providing a second spring disposed between the first face of the second piezoelectric element and a respective second portion of the internal surface of the housing; and clamping the second conformal layer between the housing and the second face of the second piezoelectric element by biasing the second spring to obtain the selected preload force.

11. An ultrasonic time-of-flight flow sensor for measuring the rate of flow of a fluid, the sensor comprising:

a flow sensor body through which the fluid flows when the sensor operates;

two elongated side-looking transducers having respective axes, each transducer connected to the body, each transducer displaced from the other along a direction in which fluid flows through the sensor body when the sensor operates, each transducer oriented with its respective axis perpendicular to the direction in which fluid flows when the sensor operates, each transducer arranged so that a substantial portion of an external surface of a respective housing portion of each of the transducers is wetted by the fluid when the fluid flows through the sensor body; each of the housings having a respective selected diameter, each of the transducers further comprising at least one respective thickness-mode piezoelectric element having two parallel faces and disposed within the respective housing so that both of the faces are parallel to the axis of the respective transducer, each of the piezoelectric elements clamped against a respective first internal surface of the respective transducer housing by means of a spring disposed between the piezoelectric element and a respective second internal surface portion of the housing so as to define an active length portion of the respective transducer, wherein the respective active length portion of each of the transducers is substantially greater than the selected diameter of its respective housing.

12. The flow sensor of claim 11 wherein the transducer housings are integrally molded with the flow sensor body.

13. The flow sensor of claim 11 wherein each of the transducer housings comprises a respective first flat internal surface portion separated from the respective at least one piezoelectric element by a respective conformal layer, each of the at least one piezoelectric elements biased against the respective internal surface by a respective combination of a respective spring and a respective wedge inserted between the respective spring and a respective second flat internal surface portion.

14. The flow sensor of claim 13 wherein the respective internal walls of the two transducers are parallel to each other.

15. The flow sensor of claim 11 wherein each transducer comprises exactly one elongated piezoelectric element.

16. The flow sensor of claim 11 wherein each transducer comprises two piezoelectric elements spaced apart along the respective transducer axis.

17. An ultrasonic time-of-flight flow sensor for measuring a rate at which a fluid flows, the sensor comprising an insertion probe and a reflecting surface, the insertion probe comprising:

a housing having an internal surface comprising two flat internal front wall portions distal from a stem portion of the housing, the front wall portions aligned so as to form an acoustic beam with the reflecting surface when the fluid is present and the sensor is operating;

two thickness-mode piezoelectric transducer elements, each having a respective electrode associated with each of two faces thereof, a respective first of the two faces of each of the transducer elements coupled to a respective one of the wall portions by a respective conformal layer;

two acoustic isolation means, each attached to the respective second face of a respective one of the piezoelectric elements; and two springs, each disposed between a respective piezoelectric element and a respective second portion of the internal surface of the at least one housing, the respective second portion more proximal the stem of the housing than is either of the front wall portions, each spring biasing the respective piezoelectric element toward the respective front wall so as to clamp the respective conformal layer between the respective front wall portion and the respective piezoelectric element.

18. The flow sensor of claim 17 wherein the housing comprises:

an end member comprising both of the two flat internal wall portions; and a stem member having both of the two springs attached directly thereto.

* * * * *